United States Patent
Kim

(10) Patent No.: US 8,615,424 B2
(45) Date of Patent: Dec. 24, 2013

(54) ELECTRONIC TOLL SETTLEMENT SYSTEM FOR VEHICLE

(75) Inventor: Jong Hyup Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 318 days.

(21) Appl. No.: 12/534,973

(22) Filed: Aug. 4, 2009

(65) Prior Publication Data

US 2010/0036716 A1 Feb. 11, 2010

(30) Foreign Application Priority Data

Aug. 10, 2008 (KR) ........................ 10-2008-0098793

(51) Int. Cl.
*G07B 15/00* (2011.01)
*G07B 15/02* (2011.01)
*G06F 17/00* (2006.01)
*G06G 7/00* (2006.01)

(52) U.S. Cl.
USPC ........................................... 705/13; 705/400

(58) Field of Classification Search
USPC ................... 705/13, 1.1, 400, 7.35
See application file for complete search history.

(56) References Cited

U.S. PATENT DOCUMENTS

| | | | |
|---|---|---|---|
| 6,653,946 B1 * | 11/2003 | Hassett | 340/928 |
| 2003/0179107 A1 * | 9/2003 | Kibria et al. | 340/932.2 |
| 2005/0086100 A1 * | 4/2005 | Yanagisawa et al. | 705/13 |
| 2005/0182674 A1 * | 8/2005 | Yeo | 705/13 |
| 2005/0238149 A1 | 10/2005 | De Leon | |
| 2009/0012851 A1 * | 1/2009 | Marc | 705/13 |
| 2010/0274641 A1 * | 10/2010 | Allen et al. | 705/13 |

FOREIGN PATENT DOCUMENTS

| | | | |
|---|---|---|---|
| JP | 2000-099782 A | 4/2000 | |
| JP | 2001-134793 A | 5/2001 | |
| JP | 2006213132 A | * 8/2006 | |
| KR | 2002-0064490 A | 8/2002 | |
| KR | 10-2006-0007542 A | 1/2006 | |
| KR | 10-2006-0062548 A | 6/2006 | |
| KR | 2007-0103827 A | 10/2007 | |
| KR | 10-2008-0016262 A | 2/2008 | |
| KR | 10-2008-0020157 A | 3/2008 | |
| WO | WO2006/019363 | * 2/2006 | G07B 15/00 |

* cited by examiner

*Primary Examiner* — George Chen
(74) *Attorney, Agent, or Firm* — Edwards Wildman Palmer LLP; Peter F. Corless

(57) ABSTRACT

The present invention relates to an electronic toll settlement device of a vehicle, more particularly, to a technology which settles an insufficient amount from a mobile communications server and delivers to a toll settlement server through a mobile communications terminal when the balance of a high-pass terminal is worth less than a toll.

4 Claims, 2 Drawing Sheets

ELECTRONIC TOLL SETTLEMENT SYSTEM FOR VEHICLE

CROSS-REFERENCE TO RELATED APPLICATION

This application claims under 35 U.S.C. §119(a) the benefit of Korean Patent Application No. 10-2008-0098793 filed on Oct. 8, 2008, the entire contents of which are incorporated herein by reference.

BACKGROUND OF THE INVENTION

The present invention relates to an ETCS (Electronic Toll Settlement Device of a vehicle which wirelessly communicates with a high-pass terminal of a vehicle in driving and automatically receives a toll of the vehicle from the high-pass terminal.

According to preferred embodiments of the present invention, the high-pass terminal of a vehicle mounts a smart card in which an advance toll payable is charged up while wirelessly communicating with a toll settlement server in a tollgate that is installed at an expressway, such that a toll of the vehicle is automatically paid.

Preferably, a high-pass terminal user may visit an expressway business office in order to charge up the smart card with an advance toll payable. According to preferred embodiments of the invention, the high-pass terminal user may purchase additional toll charge to charge up the smart card with advance toll.

Accordingly, in certain preferred examples of the present invention the advance toll payable which is charged in the smart card is worth less than the toll of the expressway in driving, and then the toll is not normally paid, and if then, the vehicle in which the smart card is mounted is registered in a suitable database of a charge settlement server in a tollgate as a violating vehicle.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention provides an electronic toll settlement device of a vehicle which is capable of settling accounts by suitably receiving an insufficient amount from a mobile communications server and then suitably delivering information to a toll settlement server when the balance of a high-pass terminal is short.

Preferably, the electronic toll settlement device of the present invention includes a data receiver that suitably receives information of toll payable according to an insufficient amount generated in a toll settlement between a toll settlement server and a high-pass terminal of a vehicle; and a wireless local communications module that suitably delivers the information of the toll payable and vehicle to a mobile communications server through a mobile communications terminal, the mobile communications server suitably processing payment of the toll payable and delivering the information of a paid toll and vehicle to the toll settlement server for a settlement.

In accordance with further preferred embodiments of the present invention, toll payable is meant to refer to a total amount, or to the insufficient amount, of a toll.

Preferably, the electronic toll settlement device of the present invention further includes a suitable database in which mobile communications terminal information of a toll obligator of a vehicle is suitably registered; a key input unit that suitably generates an user control signal; a controller that suitably searches the information of the mobile communications terminal which would deliver information of toll payable and vehicle in a database; and a display unit that suitably displays toll payable information.

In accordance with further preferred embodiments of the present invention, the mobile communications server preferably includes an authenticator that suitably authenticates the mobile communications terminal; a communications module which suitably delivers a payment confirmation request message to the mobile communications terminal in case of succeeding in an authentication of the mobile communications terminal, and then receives a suitable payment confirmation message generated in response to the settlement confirmation request message, from the mobile communications terminal; and a payment unit which suitably processes payment of the toll payable based on the payment confirmation message, and delivers the paid toll to the toll settlement server.

In accordance with further preferred embodiments of the present invention, the toll settlement server preferably includes a wireless communications means which suitably settles a toll of the vehicle in driving with wirelessly communicating with the high-pass terminal; a violation vehicle register which suitably registers the vehicle in which the high-pass terminal is installed as a violation vehicle in a database if an insufficient amount is generated in the toll settlement; a data receiver which suitably receives the information of the paid toll and vehicle from the mobile communications server; a violation vehicle deregistration unit that suitably cancels a violation vehicle registration of a vehicle in the database through the information of the paid toll and vehicle; and a data transmission unit that suitably delivers a deregistration result of the vehicle to the mobile communications terminal such that the mobile communications terminal delivers this to the electronic toll settlement device.

In further preferred embodiments of the present invention, the electronic toll settlement device of a vehicle of the present invention suitably settles accounts of an insufficient amount from a mobile communications server and then suitably delivers to a toll settlement server when the balance of a high-pass terminal is short. Further, according to the present invention, the inconvenience of visiting in person, for example, visiting an office in person, for settlement of violating vehicle deregistration when the violation is generated as a result of a short balance of a high-pass terminal, is addressed by the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

In one aspect, the present invention features an electronic toll settlement device of a vehicle, the device comprising a data receiver that receives information of toll payable, and a wireless local communications module that delivers the information of the toll payable and vehicle to a mobile communications server through a mobile communications terminal.

In one embodiment, the data receiver receives information of toll payable according to an insufficient amount generated in a toll settlement between a toll settlement server and a high-pass terminal of a vehicle.

In another embodiment, the mobile communications server processes payment of the toll payable and delivers the information of a paid toll and vehicle to the toll settlement server for a settlement.

The invention also features a motor vehicle comprising the electronic toll settlement device of a vehicle of any one of the aspects herein.

Figure 1:
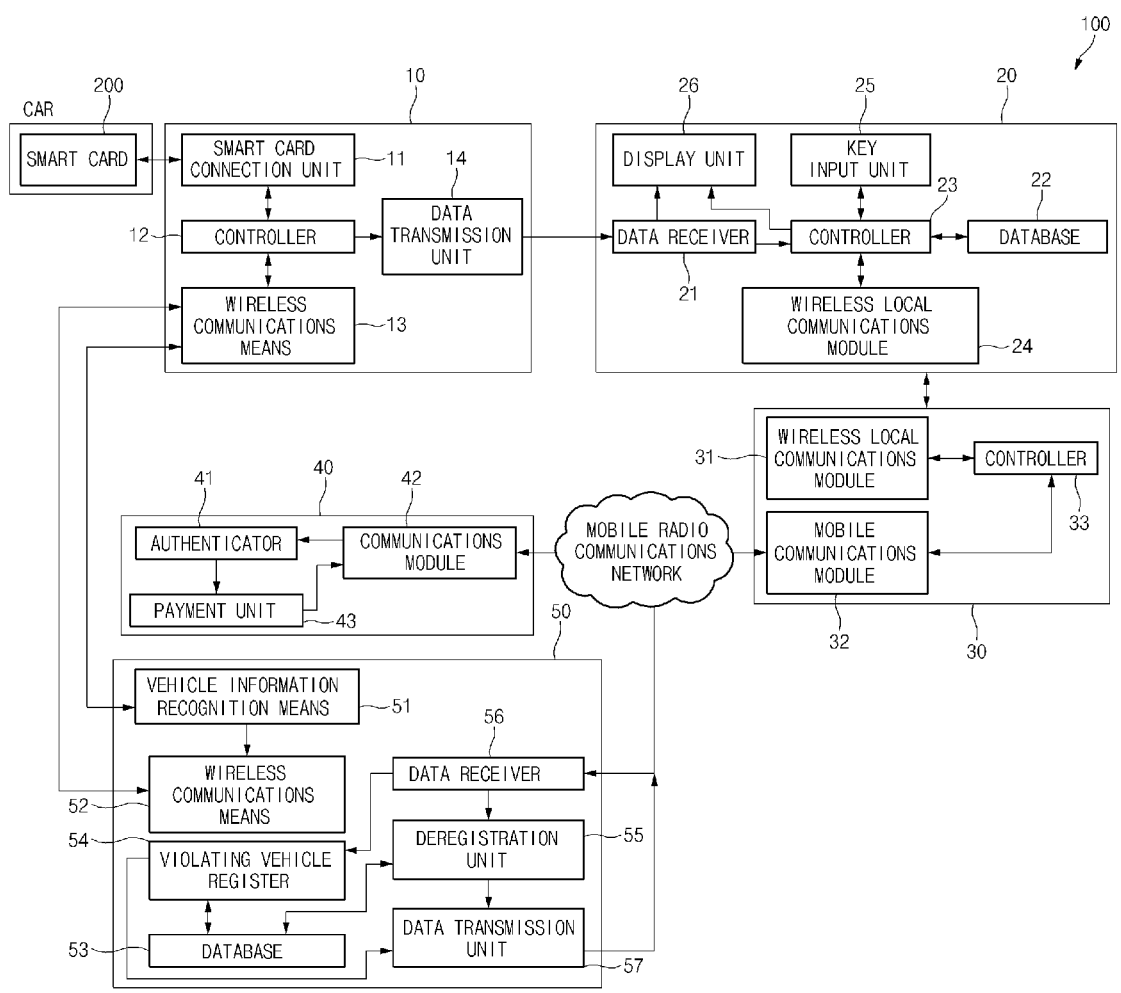
FIG. 1 is a block diagram of an electronic toll collection system of a vehicle according to preferred embodiments of the present invention.

Hereinafter, exemplary embodiments of the present invention will be described in detail with reference to the attached drawings FIG. 1 is a block diagram of an electronic toll collection system 100 of a vehicle according to preferred embodiments of the present invention.

For example, and as shown in FIG. 1, the electronic toll collection system of a vehicle 100 of the present invention preferably includes a high-pass terminal 10, an electronic toll settlement device 20, a mobile communications terminal 30, a mobile communications server 40, and a toll settlement server of the tollgate 50.

Preferably, the high-pass terminal 10 includes a smart card connection unit 11, a controller 12, a wireless communications means 13 and a data transmission unit 14.

According to certain preferred embodiments, the smart card connection unit 11 suitably inputs and outputs data while being electrically connected with the smart card 200 in which a toll is charged. Preferably, the smart card refers to all cards which are suitably equipped with an IC (integrated circuit) memory device and are able to suitably contain high-capacity information. Preferably, in the smart card, all kinds of toll settlement information as well as basic information including charging money information, a card serial number, a date of issue, a digital signature are suitably stored.

In other further embodiments of the present invention, the controller 12 suitably controls the smart card connection unit 11 according to a toll settlement request signal of the toll settlement server 50 to settle the toll with the balance which is charged in the smart card. Preferably, the controller 12 suitably delivers a toll settlement information to the toll settlement server 50 through the wireless communications means 13, described herein, in case the toll is normally settled. Preferably, the toll settlement information refers to a balance before the settlement, toll payable, and a balance after the settlement, a smart card serial number, and smart card owner information.

According to further exemplary embodiments, when the toll which is suitably charged in the smart card is insufficient than the toll requested in the toll settlement server 50 and the toll is not normally settled, the controller 12 suitably delivers the information of the toll payable according to the insufficient amount of money to a data receiver 21 of the electronic toll settlement device 20 through the data transmission unit 14, described herein. Accordingly, the controller 12 suitably delivers the toll un-settlement information through the wireless communications means 13, described herein, to the toll settlement server 50 in case the toll is not settled.

In further preferred embodiments, the toll payable is preferably made of the insufficient amount of money or a total amount of the toll. In examples where the toll that is paid is insufficient, the controller 12 firstly settles the toll with the charge remaining in the smart card, and then, leaves as the rest an insufficient amount of money as the toll payable that remains, although the toll which is suitably charged in the smart card is an insufficient amount to settle the toll requested by the toll settlement server 50.

In other preferred embodiments, when the toll payable is preferably made of the total amount of the toll, if the toll which is charged in the smart card is insufficient than the toll requested by the toll settlement server 50, the controller 12 stops the settlement, leaving the total amount of toll requested by the toll settlement server 50 as the toll payable.

Accordingly, by using a RF (Radio Frequency) module, or an IR (InfraRed) module, the wireless communications means 13 suitably receives the toll settlement request signal from the wireless communications means 52 of the toll settlement server 50, described herein, and suitably delivers to the smart card connection unit 11. In other further embodiments, the wireless communications means 13 suitably delivers the toll settlement information or the toll un-settlement information delivered from the smart card connection unit 11 to the wireless communications means of the toll settlement server 50.

Preferably, the data transmission unit 14 suitably delivers the toll payable to the data receive unit of the electronic toll settlement device 20, described herein, through a CAN communications.

In other further embodiments, the electronic toll settlement device 20 is preferably usually embedded in a dashboard or the like of a vehicle, and suitably includes a data receiver 21, a database 22, a controller 23, a wireless local communications module 24, a key input unit 25, and a display unit 26.

Preferably, the data receiver 21 receives information of the toll payable from the data transmission unit 14 of the highpass terminal 10 through the CAN communications of vehicle.

Further, the information (MAC address or the like) of the mobile communications terminal 30 which would deliver the information of the toll payable and the information of the vehicle when the insufficient amount of money is generated is already suitably registered in the database 22.

In other preferred embodiments, the controller 23 searches the information of the mobile communications terminal 30 which would suitably deliver the information of the toll payable and the information (for example, license plate numbers, vehicle owner personal information) of vehicle in the database 22.

Accordingly, the wireless local communications module 24 is, preferably, made of a blue tooth module, and suitably delivers the information of the toll payable and the information (license plate numbers, vehicle owner personal information) of vehicle to a wireless local communications module 31 of the mobile communications terminal 30 which is searched in the database 22. The key input unit 25 generates a user control signal.

In other preferred embodiments, the display unit 26 is made of LCD or the like, and suitably displays the toll payable information.

Preferably, the mobile communications terminal 30 suitably includes the wireless local communications module 24, the controller 23, and a mobile communications module 32.

According to further preferred embodiments of the present invention, the wireless local communications module 31 is preferably comprised of the blue tooth module and suitably receives the information of the toll payable and the information of the vehicle from the wireless local communications module 24 of the electronic toll settlement device 20.

In other preferred embodiments, the controller 23 adds terminal information of the mobile communications terminal 30, for example, but not limited to, an USIM (Universal Subscriber Identity Module) information to the information of the toll payable and the information of the vehicle, delivering them to the mobile communications server 40 through the mobile communications module 32.

Preferably, the mobile communications module 32 delivers the information of the toll payable, the information of the vehicle and the terminal information of the mobile communications terminal 30 to the toll settlement server 50.

According to certain exemplary embodiments, the mobile communications server 40 includes a communications module 42, an authenticator 41, a payment unit 43.

Preferably the communications module 42 suitably receives the information of the toll payable, the information of the vehicle and the terminal information of the mobile communications terminal 30 from the mobile communications module 32 of the mobile communications terminal 30, and suitably delivers them to the authenticator 41.

Preferably, the authenticator 41 suitably authenticates the terminal information of the mobile communications terminal 30, that is, the USIM information based on an additional member information database (not shown).

In further preferred embodiments, the communications module 42 suitably delivers the settlement confirmation request message to the mobile communications terminal 30 if it succeeds in the authentication of USIM information of the mobile communications terminal 30. Further, the communications module 42 suitably receives the payment confirmation message which is generated in response to the settlement confirmation request message from the mobile communications terminal 30.

Preferably, in further embodiments, the payment unit 43 pays the toll payable with a suitably method of mobile phone micro settlement based on the payment confirmation message, and then delivers a paid toll to the data receiver of the toll settlement server 50 through the communications module. Preferably, the delivering of the paid toll can be suitably performed by a method of paying a corresponding amount on an actual account in fact, or by a method of attaching and delivering a digital receipt, or a settlement identification corresponding to the paid toll.

Preferably, in further exemplary embodiments, the toll settlement server 50 includes, but is not limited to only, a vehicle information recognition means 51, a wireless communications means 52, a violation vehicle register 54, a data receiver 56, a deregistration unit 55, a data transmission unit 57.

In related embodiments, after measuring the width, the height, and the length of a driving vehicle which entered within a radio wave reaching distance, and searching them in an additional vehicle information database (not shown) and confirming a vehicle model, the vehicle information recognition means 51 suitably calculates the toll of a corresponding vehicle according to the vehicle model.

Preferably, the wireless communications means 52 wirelessly communicates with the wireless communications means 13 of the high-pass terminal 10 installed in the vehicle which entered within the radio wave reaching distance, the vehicle model of which is determined by the vehicle information recognition means 51. Accordingly, the wireless communications means 52 suitably delivers the toll settlement request signal to the wireless communications means 13 of the high-pass terminal 10. Moreover, the wireless communications means 52 receives the toll settlement information or the toll un-settlement information from the wireless communications means 13 of the high-pass terminal 10.

Preferably, the violation vehicle register 54 registers the vehicle in which the high-pass terminal 10 receiving the toll un-settlement information is installed as a violation vehicle in a database 53 based on the toll un-settlement information.

In preferred embodiments, the data receiver 56 delivers the payment confirmation message delivered from the mobile communications server 40 to the deregistration unit 55.

Further, in case of receiving the paid toll from the mobile communications server 40, the deregistration unit 55 cancels the violation vehicle registration of the vehicle on the database 53 through the information of vehicle.

Accordingly, the data transmission unit delivers the violating vehicle deregistration result to the mobile communications terminal 30.

The operation of an electronic toll collection system 100 of a vehicle of the present invention is described herein.

Figure 2:
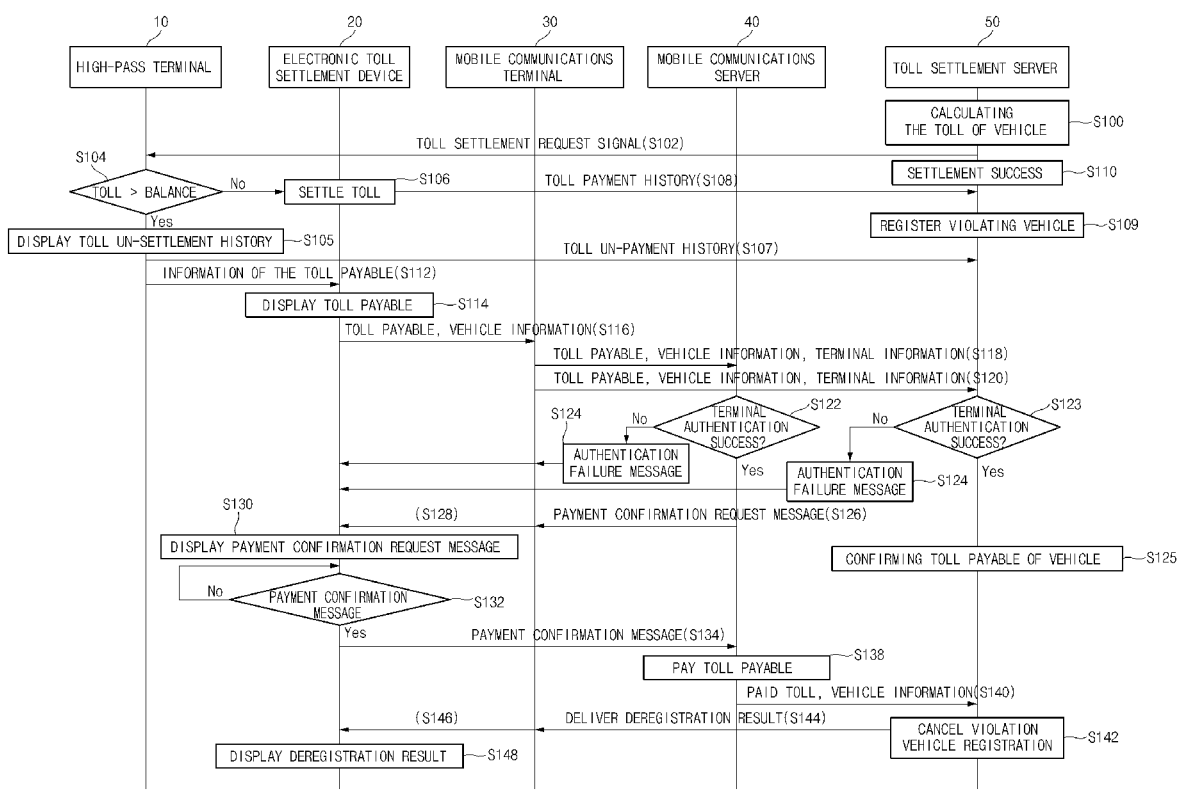
FIG. 2 is a flowchart showing the operation of an electronic toll collection system of a vehicle according to preferred embodiments of the present invention.

According to certain preferred embodiments and as shown in FIG. 2, a flowchart shows the operation of the electronic toll collection system 100 of a vehicle according to the present invention.

In certain examples, as shown in FIG. 2, if a vehicle driving on expressway enters into within a radio wave reaching distance, the vehicle information recognition means 51 of the toll settlement server 50 preferably measures the width, the length and the height of the vehicle, and calculates the toll of vehicle (S100).

According to further preferred embodiments, the wireless communications means 52 of the toll settlement server 50 suitably delivers the toll settlement request signal for the toll to the wireless communications means 13 of the high-pass terminal 10 (S102).

Preferably, the controller 12 of the high-pass terminal 10 suitably controls the smart card connection unit 11 and grasps whether the toll is worth less than the balance which is charged in the smart card or not (S104).

According to further exemplary embodiments, if the toll is worth less than the balance which is charged in the smart card, the controller 12 of the high-pass terminal 10 suitably settles the toll with the amount of money charged in the smart card (S106), and then, if it succeeds in the settlement, the toll settlement information is suitably delivered to the toll settlement server 50 through the wireless communications means 13 (S108).

Accordingly, if the toll is greater than the balance which is charged in the smart card, by using, for example, a voice guidance and an alarm sound operation, the controller 12 of the high-pass terminal 10 suitably displays the toll un-settlement information (S105).

Preferably, the controller 12 of the high-pass terminal 10 suitably delivers the toll un-settlement information to the wireless communications means 57 of the toll settlement server 50 through the wireless communications means (S107).

Preferably, the controller of the high-pass terminal 10 suitably delivers the information of the toll payable to the data receiver 56 of the electronic toll settlement device 20 (S112).

In further preferred embodiments, after receiving the toll settlement information from the high-pass terminal 10, the data receiver 56 of the toll settlement server 50 suitably records in the database 53 as a settlement success for the high-pass terminal 10 (S110), and then, the flow is ended.

Preferably, if the data receiver 56 of the toll settlement server 50 suitably receives the toll un-settlement information from the high-pass terminal 10, delivering this to the violation vehicle register 54.

Preferably, the violation vehicle register 54 of the toll settlement server 50 suitably registers the vehicle as a violation vehicle in the database 53 based on the toll un-settlement information (S109).

In other preferred embodiments, the data receiver 56 of the electronic toll settlement device 20 suitably receives the information of the toll payable from the high-pass terminal 10 and then suitably displays the toll payable information to the display unit 26 (S114).

In further embodiments, preferably, the wireless local communications module 24 of the electronic toll settlement device 20 suitably adds the information of vehicle to the information of the toll payable, and then delivers them to the wireless local communications module 32 of the mobile communications terminal 30 which is already registered in the database 22 (S116).

In preferred embodiments, the controller 33 of the mobile communications terminal 30 suitably receives the information of the information of toll payable and vehicle, and then suitably delivers them to the communications module 42 (S118) of the mobile communications server 40 and the data receiver 56 (S120) of the toll settlement server 50 through the mobile radio communications network with the terminal information of the mobile communications terminal 30.

Further, the authenticator 41 of the mobile communications server 40 suitably authenticates the terminal information based on an additional member information database (not shown) (S122).

According to other exemplary embodiments, the controller 33 of the toll settlement server 50 suitably authenticates the terminal information based on an additional member information database (not shown) (S123), confirming the toll payable information and authentication success information of a corresponding vehicles in case of succeeding in the authentication (S125). Further, the toll settlement server 50 waits the settlement on account of the toll payable of the vehicle according to the terminal information.

Further, at step S122 and S123, a authentication failure message is suitably generated (S124), in case of failing in the authentication of the terminal. Preferably, this is delivered to the mobile communications terminal 30, then, the mobile communications terminal 30 delivers the authentication failure message to the electronic toll settlement device 20. In further preferred embodiments, the electronic toll settlement device 20 displays the authentication failure message to a user.

Preferably, at step S122, the communications module 42 of the mobile communications server 40 suitably delivers the settlement confirmation request message to the mobile communications module 32 of the mobile communications terminal 30 if it succeeds in the authentication of the mobile communications terminal 30 (S126).

Preferably, the mobile communications terminal 30 delivers the settlement confirmation request message to the electronic toll settlement device 20 (S128).

In further preferred embodiments of the invention, the electronic toll settlement device 20 displays the settlement confirmation request message through the display unit 26 (S130), and determines whether the payment confirmation message for the settlement confirmation request message is suitably inputted through the key input unit 25 (S132).

According to other preferred embodiments, the electronic toll settlement device 20 delivers the payment confirmation message to the mobile communications terminal 30 (S134), and the mobile communications terminal 30 preferably delivers the payment confirmation message to the mobile communications server 40 (S136).

In further preferred embodiments, the mobile communications server 40 preferably pays the toll payable based on the payment confirmation message (S138), and delivers the information of a paid toll and vehicle to the data receiver of the toll settlement server 50 (S140).

Preferably, the deregistration unit 55 of the toll settlement server 50 suitably cancels the violation registration of the target vehicles on the database 53 with reference to the information of the paid toll and vehicle delivered from the mobile communications server 40 (S125) and the information of the toll payable and authentication success of a corresponding vehicle of S125 (S142).

Preferably, the data transmission unit 57 of the toll settlement server 50 delivers the deregistration result of the vehicle to the mobile communications terminal 30 (S144), and the mobile communications terminal 30 then suitably delivers this to the electronic toll settlement device 20 (S146).

In preferred exemplary embodiments, the electronic toll settlement device 20 suitably displays the deregistration result of the vehicle to the user through the display unit 26 (S148).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electronic toll settlement system embedded in a dashboard of a vehicle, the system comprising:
   a high-pass terminal configured to be electrically connected with a smart card being charged with a balance amount, in conjunction with a toll settlement server, performs a settlement with a balance charged on the smart card, wherein when the amount of the balance remaining on the smart card is insufficient to settle the toll requested by the toll settlement server, the high pass terminal generates information of a toll payable based on the insufficient amount to settle a remaining portion of the toll on a mobile communication server via a mobile phone micro settlement; and an electronic toll settlement device including:
- a data receiver, embedded within the dashboard of the vehicle, configured to receive the information of toll payable according to an insufficient amount generated in a toll settlement between a toll settlement server and a high-pass terminal; and
- a wireless local communications module, embedded within the dashboard of the vehicle, configured to deliver the information of the toll payable and vehicle to a mobile communications server through a mobile communications terminal embedded within the vehicle, the mobile communications server processing payment of the toll payable and delivering the information of a paid toll and vehicle to the toll settlement server for a settlement,
- wherein the information of the toll payable is a total amount or the insufficient amount of a toll, and when the amount of the balance charged in the smart card is insufficient to settle the toll requested by the toll settlement server, the high pass terminal settles the toll with the balance charged in the smart card first, then generates the information of the toll payable for the insufficient amount, or stops the settlement and then generates the information of the toll payable for the total amount of the toll requested by the toll settlement server.

2. The electronic toll settlement system of claim 1, further comprising:
- a database in which mobile communications terminal information of a toll obligator of a vehicle is registered;
- a key input unit that generates an user control signal;
- a controller that searches the information of the mobile communications terminal which would deliver information of toll payable and vehicle in a database; and
- a display unit that displays the toll payable information.

3. The electronic toll settlement system of claim 1, wherein the mobile communications server comprises:
- an authenticator that authenticates the mobile communications terminal;
- a communications module which delivers a payment confirmation request message to the mobile communications terminal in case of succeeding in an authentication of the mobile communications terminal, and receives a payment confirmation message generated in response to the settlement confirmation request message, from the mobile communications terminal; and
- a payment unit which processes payment of the toll payable based on the payment confirmation message, and delivers the paid toll to the toll settlement server.

4. The electronic toll settlement system of claim 1, wherein the toll settlement server comprises:
- a wireless communications means which communicates wirelessly with the high-pass terminal;
- a violation vehicle register which registers the vehicle in which the high-pass terminal is installed as a violation vehicle in a database if the insufficient amount is generated in the toll settlement;
- a data receiver which receives the information of the paid toll and vehicle from the mobile communications server;
- a violation vehicle deregistration unit that cancels a violation vehicle registration of a vehicle in the database through the information of the paid toll and vehicle; and
- a data transmission unit that delivers a deregistration result of the vehicle to the mobile communications terminal such that the mobile communications terminal delivers this to the electronic toll settlement device.

* * * * *